Aug. 26, 1958

D. C. SMITH 2,849,618

HIGH RESOLUTION INFRA-RED SPECTROMETER ANALYZER FOR GASES

Filed July 20, 1953

INVENTOR.
*D. C. Smith*
BY
*Hardon and Young*
ATTORNEYS

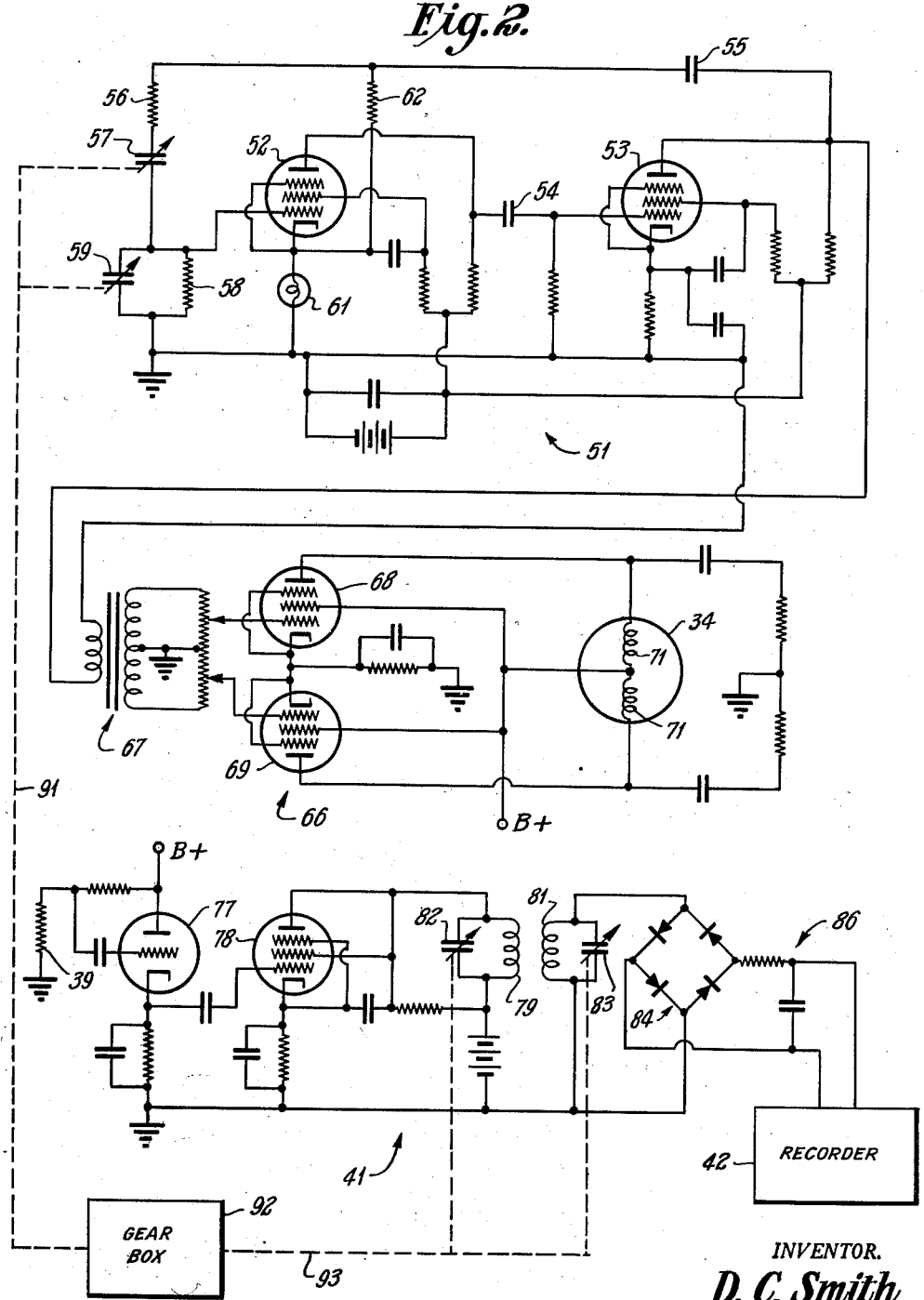

United States Patent Office 2,849,618
Patented Aug. 26, 1958

2,849,618

HIGH RESOLUTION INFRA-RED SPECTROMETER ANALYZER FOR GASES

Donald C. Smith, Bartlesville, Okla., assignor to Phillips Petroleum Company, a corporation of Delaware Application July 20, 1953, Serial No. 369,170

11 Claims. (Cl. 250—43.5)

This invention relates to an infra-red spectrometer analyzer for gases. In one of its specific aspects, the invention relates to a method for determining the presence and quantity of a specific gas in a mixture of gases. In another of its specific aspects, the invention relates to an apparatus for determining the presence and measuring the quantity of a specific gas in a mixture of gases.

Non-dispersion type infra-red analyzers have been and are being used extensively and successfully in plant operations in the analysis of plant streams. The instruments of this type may be further classified as the chopped beam and steady-state types depending on whether a steady or chopped beam of radiation is used. Analyzers of the non-dispersion type, however, all characteristically utilize a combination of cells which may be variously designated as sample, standard sample, interference or compensator cells. One of the principal disadvantages of these instruments is the difficulty of maintaining the cells in satisfactory operating condition free of leaks and at proper temperature. This is especially true in the case of the standard sample cell where any loss or contamination of the standard sample will result in inaccurate readings. Other difficulties arise in the employment of these instruments where it is desired to analyze for one gas in the presence of several other gases. In such a case it is necessary to eliminate the interference caused by the background gases by utilizing the interference and compensator cells. During the process of sensitizing the instrument so as to remove interference from background gases, a certain amount of the original source energy is absorbed, and when the amount of absorption becomes considerable, the amount of energy available for signal strength decreases. As the amount of energy available for signal strength decreases, the degree of amplification must necessarily be increased. And since there is a limit to the point to which such electrical amplification can be carried and still receive accurate and reliable readings, the problem of background gases imposes a definite limitation upon an analyzer of the non-dispersion type. Furthermore, when there is a multiplicity of interfering gases having different spectral characteristics, it is often impossible to completely eliminate interference from background absorption. By utilizing the infra-red analyzer of this invention, the above described disadvantages of the non-dispersion type analyzer are substantially overcome, and a method of analysis suitable for plant operations is made available.

The following objects will be attained by the various aspects of the invention.

It is an object of the present invention to provide a method and apparatus for determining the presence and quantity of a specific gas in a mixture of gases.

It is also an object of this invention to provide a dispersion type infra-red analyzer suitable for use in plant operation as a means for process control.

Another object of this invention is to provide an apparatus which is insensitive to background interference and does not depend upon cells or filters for such insensitivity.

Still another object of this invention is to provide an apparatus embodying the features of accuracy, durability and dependability.

Various other objects and advantages will become apparent from the accompanying disclosure.

Certain gases are characterized by infra-red absorption bands composed of a multiplicity of lines which, to a first approximation, occur with equal spacing over a definite spectral interval. In particular, linear molecules give absorption bands whose line positions occur on a frequency scale with approximately equal spacing. This spacing is dependent only upon the moment of inertia of the molecules and is different for all linear molecules except those having an identical moment of inertia. Furthermore, certain non-linear symmetrical molecules have regularly spaced lines within certain regions of absorption. These lines are further characterized at least in certain regions of absorption by nearly equal intensity of adjacent lines, the degree of intensity depending upon the number of molecules present. In accordance with one embodiment of this invention, a fixed spectral interval, which will contain a definite number of rotation lines characteristic of the molecules of the gas being tested for, is rapidly scanned at a uniform rate so as to give an approximately sinusoidal signal whose frequency and amplitude are indicative of the presence and of the quantity of that particular gas. The conditions necessary to obtain an approximately sinusoidal signal represent minimum spectral resolution requirements. In accordance with another embodiment of this invention, a higher resolving power can be used, in which case a pulse-type signal, characteristic of the particular gas being tested for, is obtained rather than a sine wave signal.

For a better understanding of the invention, reference should be had to the following descriptive matter and drawing, in which:

Figure 2 is a diagrammatic circuit diagram, showing the relationship between the means for controlling the speed of the synchronous motor and the frequency response of the tuned amplifier.

Figure 1:
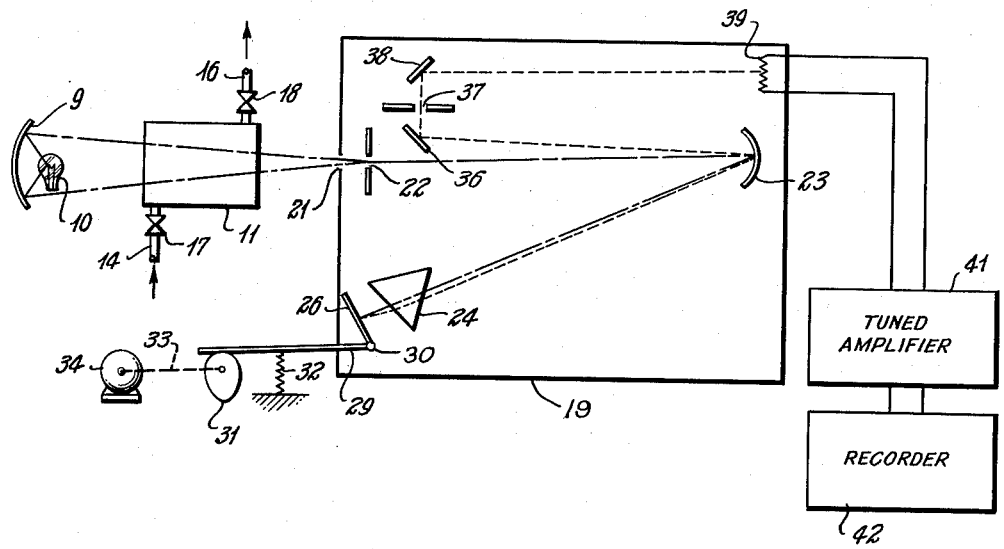
Figure 1 is a schematic view of the optical system of the infra-red spectrometer analyzer of this invention, including a tuned amplifier and recorder.

Referring to the drawing and to Figure 1 in particular, infra-red radiation reflected from source 10 by mirror 9 is passed through cell 11 containing windows 12 and 13. The windows are transparent and should be formed of a material which will not cut off radiation at frequencies covering the spectral interval to be scanned. Cell 11 is provided with an inlet conduit 14 and an outlet conduit 16 whereby gases may be continuously circulated therethrough. By the inclusion of valves 17 and 18, provision is also made for sealing a gas within cell 11.

After leaving cell 11, the beam of infra-red radiation is introduced into monochromator 19 through opening 21 and thereafter passes through slit 22. From slit 22, the beam is directed to mirror 23 which reflects the beam to a dispersing prism 24 through which it is refracted to Littrow mirror 26. Other dispersing means such as a diffraction grating may be used instead of prism 24 to resolve the beam into its spectrum. While the monochromator has been described with a certain degree of particularity, it is not intended to so limit the invention, and any conventional monochromator can be adapted for use with the present invention. Mirror 26 is rigidly attached to arm 29 which is pivoted at axis 30 and rides on cardiac 31 under the force applied by spring 32. Cardiac 31 is rotated through mechanical linkage 33 by synchronous motor 34 which can be operated at any desired speed as will be described more in detail hereinafter in conjunction with Figure 2. By this arrangement, mirror 26 can be rotated back and forth through a known angle so as to scan repeatedly at a known rate a definite and fixed portion of the spectrum. By utilizing cardiacs of suitable construction and by varying the angle between mirror 26 and arm 29, any desired spectral interval can be scanned, and during one revolution of cardiac 31 the interval chosen will be scanned two times.

A beam of infra-red radiation of a wave length dependent upon the instantaneous position of mirror 26 is reflected therefrom back to prism 24 by which it is refracted back to mirror 23 which in turn reflects it to mirror 36 and thence through adjustable slit 37. As mirror 26 moves back and forth, beams of other wave lengths in accordance with the selected spectral interval will pass through slit 37 and be reflected by mirror 38 to a radiation detector such as bolometer 39. While a bolometer is illustrated as being the type of radiation detector employed, it is to be understood that other detectors such as a thermistor, a thermocouple, a photo cell, a lead sulfide or lead telluride cell or the like can be used. The different wave lengths and intensities of infra-red radiation impinge upon bolometer 39 and result in a flow of current which is characteristic of the spectral interval being scanned. The output of bolometer 39 is fed into tuned amplifier 41 which has been tuned to a specific frequency corresponding to that of the signal which is characteristic of the gas being tested for at the particular spectral interval being scanned and at the particular rate of scanning. The details of tuned amplifier 41 will be described more in detail hereinafter in conjunction with Figure 2. The output of tuned amplifier 41 after being rectified is fed into recorder 42, which may be of a type well known to the art, and the amplitude of the signal recorded thereon is indicative of the quantity of the gas being tested for, which is present in cell 11.

Referring to Figure 2 of the drawing, an oscillation generator 51 comprises a pair of amplifying tubes 52 and 53 coupled together by resistance capacity means in a manner well known in the art. For the sake of clarity, the cathode heating supply and the voltage supply sources have been omitted from the circuit. The anode of tube 52 and the control grid of tube 53 are connected through coupling condenser 54 while the anode of tube 53 is connected to a circuit which provides a feedback to the control grid of tube 52. The feedback circuit comprises coupling condenser 55 connected in series with resistance 56, variable condenser 57, and parallel connected resistance 58 and variable condenser 59. In order to provide for amplifier stabilization, a negative feedback is provided from the output of tube 53 by the inclusion of resistance 62 in a circuit to the cathode of tube 52. By including an incandescent lamp 61 in the cathode circuit of tube 53, means are provided for maintaining the generated oscillations at substantially a constant amplitude. For a more detailed description of the oscillation generator, U. S. Patent 2,268,872 may be referred to.

By adjusting variable condensers 57 and 59, an oscillating signal of desired frequency is obtained which is fed to push-pull amplifier circuit 66 which supplies the power to motor 34. Amplifier circuit 66 comprises input transformer 67 having a center tapped secondary, two amplifier tubes 68 and 69, the output from which is supplied to the coils 71 of motor 34. Tubes 68 and 69 are so arranged that their input grids are excited with equal voltage 180° out of phase. By means of this arrangement, motor 34 is rotated at a known constant rate of speed in accordance with the frequency of the signal supplied by oscillation generator 51 which in turn is determined by the adjustment given variable condensers 57 and 59.

The tuned amplifier circuit designated by reference numeral 41, comprises tube 77, pentode 78, tuned primary 79, and tuned secondary 81. The input to tube 77 is supplied by bolometer 39, and the output of tube 77 is applied to pentode 78 which is connected as a cathode follower. By adjusting variable capacitances 82 and 83, the two tuned circuits, i. e., the circuit with primary 79 and the circuit with secondary 81, are made resonant to the same frequency, and only signals of a frequency as determined by this adjustment will be amplified. Thus, the tuned amplifier is limited to the amplification of signals of known frequencies as determined by the setting of capacitances 82 and 83, and the output of secondary 81 consists only of signals of this same frequency.

The output signal of tuned secondary 81 of the tuned amplifier circuit is supplied to full wave rectifier 84 which may be copper-oxide rectifiers as shown. The D.-C. voltage produced by rectifier 84 is applied to integration circuit 86 and the resulting output voltage is indicated by recorder 42. The voltages as indicated by recorder 42 are proportional to the voltages applied to integrating circuit 87 which are in turn indicative of the amplitude of the signal produced by bolometer 39 and amplified by tuned amplifier circuit 41.

Variable condensers 57 and 59, which determine the frequency of the output signal of oscillation generator 51, are connected through mechanical linkage 91 to gear box 92. Variable condensers 82 and 83 in tuned-amplifier circuit 41 are also connected to gear box 92 through mechanical linkage 93. By a suitable gear arrangement, the tuned amplifier 41 and the oscillation generator 51 are synchronized so that the frequency setting of the tuned amplifier 41 is twice the number of lines in the spectral interval to be scanned times the frequency of the output signal of oscillation generator 51. It is to be understood that gear box 92 and mechanical linkages 91 and 93 can be omitted from Figure 2 in which case the necessary settings are made manually. This relationship may be represented by the formula $V_{TA}=2 \times V_{OG} \times n$ where $V_{TA}$ is the frequency setting of the tuned amplifier 41, $V_{OG}$ is the frequency of the output signal of oscillation generator 51, and $n$ is the number of lines in the spectral interval to be scanned. And since the spectral interval is scanned two times during one revolution of motor 34, which rotates $V_{OG}$ revolutions per second, it is necessary to multiply the product of $V_{OG} \times n$ by 2.

In the operation of the infra-red spectrometer analyzer of this invention, it is first necesary to calibrate the instrument for the particular gas which it is desired to detect. The analyzer as described above is applicable to those gases which are characterized by infra-red absorption bands composed of a multiplicity of lines which occur with equal spacing over a definite spectral interval. Accordingly, by an examination of the infra-red spectrogram of the gas to be tested for, the spectral interval to be scanned and the number of lines contained therein can be determined. The primary advantages to be derived in the analysis of a gaseous mixture employing the analytical method of this invention rather than those of the prior art lies in the fact that after selection of the spectral interval and scanning rate so as to sensitize to a particular gas, the instrument is specific for that gas and is insensitive to background absorption and to interfering absorption of practically all other gases. The quantity of detectable and interfering gas in the optical path or cell must, however, be adjusted to avoid complete absorption in the spectral region being scanned, and best operation may be expected when the net absorption of interfering gases is small and does not fluctuate.

Figure 3:
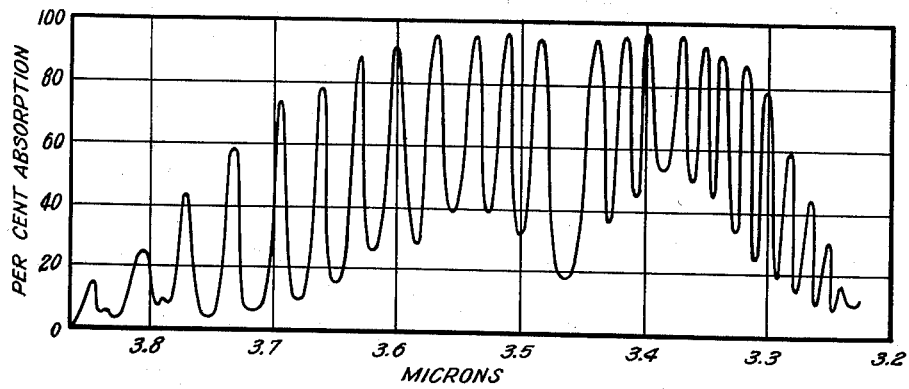
Figure 3 illustrates the absorption curve of the principal vibration-rotation band of HCl.

By way of illustration, it is assumed that it is desired to calibrate the instrument for the detection of hydrogen chloride. Referring to Figure 3, an examination of the absorption band of hydrogen chloride reveals that between 3.5 and 3.7 microns the absorption band is composed of seven lines of substantially equal intensity occurring with equal spacing. Accordingly, referring to Figure 1, by choosing a cardiac of suitable construction and by adjusting the angle between mirror 26 and arm 29, mirror 26 is set so that it will move back and forth through a constant angle in response to the rotation of motor 34 so as to scan the spectral interval between 3.5 and 3.7 microns at a uniform rate. It is next necessary to determine the number of times per second that the spectral interval is to be scanned. Assuming that it is desired to scan the spectral interval twenty times per second, referring to Figure 2, variable condensers 57 and 59 are adjusted so that oscillation generator 51 produces a signal having a frequency such that motor 34 will rotate in response thereto at a constant rate of 10 revolutions per second, thus moving mirror 26 back and forth so as to scan the spectral interval twenty times per second. Since the spectral interval to be scanned contains seven lines and the interval is to be scanned twenty times per second, the frequency of the resulting sinusoidal signal will be 140 cycles per second. Accordingly, it is necessary to tune amplifier 41 to this frequency, which is accomplished by adjusting variable condensers 82 and 83, which have already been synchronized with variable condensers 57 and 59 through mechanical linkages 91 and 93, in accordance with the number of lines, seven in this case, in the spectral interval to be scanned. The instrument is now calibrated for hydrogen chloride so that the presence and quantity of this compound in a gaseous mixture can be readily determined in the manner described below.

Referring to Figure 1, the mixture of gases, which is to be analyzed for a particular gas, for purposes of illustration assumed to be hydrogen chloride, is passed into cell 11 through inlet 14 and sealed therein by closing valves 17 and 18. It is also within the contemplation of this invention to continuously pass a stream of gases through cell 11 so as to obtain a continuous analysis which can be utilized in plant operations for process control. A beam of infrared radiation from source 10 passes through cell 11 containing the gaseous mixture and thereafter enters monochromator 19 wherein the beam is reflected and refracted as previously described. Mirror 26 continuously scans that part of the spectrum between 3.5 and 3.7 microns, which will contain seven substantially equally spaced rotation lines if hydrogen chloride is present in the gaseous mixture. The infra-red radiation of various wave length and intensities passes through slit 37 and upon being reflected by mirror 38 impinges upon bolometer 39, setting up an approximately sinusoidal signal. This signal has a frequency which is equal to the number of rotation lines contained in the scanned interval times the rate of scan; in the case of hydrogen chloride the frequency of the signal will be seven times twenty or 140 cycles per second. By using a higher resolving power, a pulse type signal at the same frequency is produced. The output signal of bolometer 39 is fed into tuned amplifier 41 which was tuned to a frequency of 140 cycles per second when the instrument was calibrated. The output of tuned amplifier 41 is indicated by recorder 42, and the amplitude of the signal recorded is indicative of the quantity of hydrogen chloride present in the gaseous mixture. Thus, by utilizing samples containing known quantities of hydrogen chloride and noting the amplitude of the signals produced, a comparison can be readily made whereby the percentage of hydrogen chloride present in the test sample can be determined. Since tuned amplifier 41 is limited to the amplification of signals of predetermined frequencies, in this case 140 cycles per second, only signals of this frequency will be indicated by recorder 42. Accordingly, if there is no hydrogen chloride present in the gaseous mixture in cell 11, recorder 42 so indicates by not recording.

The analytical method of this invention is applicable to the analysis of gases characterized by having spectral intervals containing a definite number of absorption lines of nearly equal intensity. This phenomenon occurs with gases having linear molecules, and with certain gases having non-linear symmetrical molecules. More specifically, the method of analysis as described herein is applicable to such gases as hydrogen fluoride, hydrogen bromide, hydrogen chloride, carbon monoxide, carbon dioxide, carbon disulfide, ammonia, phosphorus hydride, nitrogen dioxide, ethane, ethylene, etc., and to any other gases having similar and suitable spectral characteristics.

While the infra-red analyzer of the present invention has been described with a certain degree of particularity, it is to be understood that numerous alterations in the details of construction and arrangement of parts may be resorted to without departing from the spirit and scope of the invention. It has been previously indicated that any conventional monochromator can be adapted for use with this invention. While the means for scanning a definite and fixed spectral interval has been specifically described, it will be apparent to one skilled in the art that other scanning means as, for example, means using a cam or eccentric, vibrating means, or the like can be employed. Furthermore, it is within the contemplation of the present invention to utilize a source of radiation which provides X-rays, visible light, ultraviolet light, infra-red light or radio waves. Still further, it is possible to use a source emitting elementary particles such as electrons, alpha particles or high energy photons. Other detectors, in addition to the radiation detectors previously mentioned, which can be utilized include ionization detectors such as a Geiger counter.

As will be evident to those skilled in the art, various modifications of this invention can be made or followed without departing from the spirit of the disclosure.

I claim:

1. A method of gas analysis to determine the presence and quantity of a particular gas in a gaseous sample which comprises, in combination, the steps of passing a beam of radiation through a gaseous sample; resolving said beam into its spectrum; continuously scanning a fixed and definite interval of said spectrum containing periodic absorption lines of substantially equal intensities characteristic of said particular gas so as to produce an electrical signal; feeding said signal into a tuned amplifier, said amplifier being tuned to a frequency equal to the product of the number of absorption lines and the rate of scan.

2. A method of gas analysis to determine the presence and quantity of a particular gas in a gaseous sample which comprises, in combination, the steps of passing a beam of infra-red radiation through a gaseous sample; resolving said beam into its spectrum; continuously scanning a predetermined interval of said spectrum containing periodic absorption lines of substantially equal intensities characteristic of said particular gas so as to produce a sinusoidal signal; feeding said signal into a tuned amplifier, said amplifier being tuned to a frequency equal to the product of the number of absorption lines and the rate of scan.

3. A method of gas analysis to determine the presence and quantity of a particular gas in a gaseous mixture which comprises, in combination, the steps of passing a beam of infra-red radiation through a cell containing a mixture of gases; resolving said beam into its spectrum; continuously scanning a fixed and definite interval of said spectrum containing periodic absorption lines of substantially equal intensities characteristic of said particular gas; reflecting the various wave lengths of infra-red radiation to a radiation detector so as to produce a sinusoidal signal; feeding said signal into a tuned amplifier, said amplifier being tuned to a frequency equal to the product of the number of absorption lines and the rate of scan.

4. A method of gas analysis to determine the presence and quantity of a particular gas in a gaseous mixture which comprises, in combination, the steps of passing a beam of infra-red radiation through a cell containing a mixture of gases; resolving said beam into its spectrum; continuously scanning a fixed and definite interval of said spectrum containing periodic absorption lines of substantially equal intensities characteristic of said particular gas; reflecting the various wave lengths of infra-red radiation to a radiation detector so as to produce a pulsating signal; feeding said signal into a tuned amplifier, said amplifier being tuned to a frequency equal to the product of the number of absorption lines and the rate of scan.

5. A method of gas analysis to determine the presence and quantity of a particular gas in a gaseous mixture which comprises, in combination, the steps of passing a beam of infra-red radiation through a cell containing a mixture of gases; thereafter resolving said beam into its spectrum; continuously scanning a predetermined interval of said spectrum containing periodic absorption lines of substantially equal intensities characteristic of said particular gas; reflecting the various wave lengths of infra-red radiation to a radiation detector, thereby producing a signal; feeding said signal into a tuned amplifier, said amplifier being tuned to a frequency equal to the product of the number of said absorption lines and the rate of scan.

6. The method of claim 5 wherein the signal produced has a sinusoidal component.

7. The method of claim 5 wherein the signal produced has a pulsating component.

8. A method of gas analysis whereby the presence and quantity of a particular gas in a gaseous mixture can be determined which comprises, in combination, the following steps: refracting a beam of infra-red radiation, said beam having been passed through a cell containing a gaseous mixture; scanning continuously and at a constant rate a definite and fixed portion of the spectrum which contains periodic absorption lines of substantially equal intensities characteristic of said particular gas; reflecting infra-red radiation of varying wave lengths to a radiation detector, thereby producing a sinusoidal signal; feeding said signal into a tuned amplifier, said amplifier being tuned to a frequency equal to the product of the number of said absorption lines and the rate of scan.

9. A method of gas analysis to determine the presence and quantity of a particular gas in a gaseous mixture which comprises, in combination, the following steps: passing a beam of infra-red radiation through a cell containing a mixture of gases; reflecting said beam to a dispersing means, thereby resolving said beam into its spectrum; continuously scanning a region of said spectrum having periodic absorption lines of nearly equal intensity at a known constant rate of scan; reflecting the various wave lengths of infra-red radiation to a radiation detector, thereby producing a sinusoidal signal; applying said sinusoidal signal as the input to a tuned amplifier, said amplifier being tuned to a frequency equal to the product of the number of said absorption lines and the rate of scan.

10. A method of gas analysis whereby the presence and quantity of a particular gas in a gaseous mixture can be determined which comprises, in combination, the following steps: refracting a beam of infra-red radiation, said beam having been passed through a cell containing a gaseous mixture; scanning continuously and at a constant rate a definite and fixed portion of the spectrum which contains periodic absorption lines of substantially equal intensities characteristic of said particular gas; reflecting infra-red radiation of varying wave lengths to a radiation detector, thereby producing a pulsating signal; feeding said signal into a tuned amplifier, said amplifier being tuned to a frequency equal to the product of the number of said absorption lines and rate of scan.

11. A method of gas analysis to determine the presence and quantity of a particular gas in a gaseous mixture which comprises, in combination, the following steps: passing a beam of infra-red radiation through a cell containing a mixture of gases; reflecting said beam to a dispersing means, thereby resolving said beam into its spectrum; continuously scanning a region of said spectrum having periodic absorption lines of nearly equal intensity at a known constant rate of scan; reflecting the various wave lengths of infra-red radiation to a radiation detector, thereby producing a pulsating signal; applying pulsating signal as the input to a tuned amplifier, said amplifier being tuned to a frequency equal to the product of the number of said absorption lines and the rate of scan.

References Cited in the file of this patent

UNITED STATES PATENTS

| 2,607,899 | Carg et al. | Aug. 19, 1952 |
| 2,631,489 | Golay | Mar. 17, 1953 |
| 2,648,249 | Canada | Aug. 11, 1953 |
| 2,650,307 | Koppius | Aug. 25, 1953 |
| 2,656,468 | Schlesman | Oct. 20, 1953 |
| 2,743,646 | Strong | May 1, 1956 |